Reissued Sept. 14, 1926. Re. 16,422

UNITED STATES PATENT OFFICE.

OTIS JOHNSON, OF SAN FRANCISCO, CALIFORNIA, ASSIGNOR TO I. F. LAUCKS, INC., OF SEATTLE, WASHINGTON, A CORPORATION OF WASHINGTON.

ADHESIVE.

No Drawing. Original No. 1,460,757, dated July 3, 1923, Serial No. 581,895, filed August 14, 1922. Application for reissue filed June 5, 1924. Serial No. 718,179.

My invention relates to an adhesive formula and the product produced therefrom.

I have discovered from experiments that a high class waterproof adhesive, such as so-called glue, may be realized from soya beans, or rather the residue derived from soya beans preferably after the oily content of the beans has been extracted. This residue, I have found, contains a highly valuable adhesive constituent which provides an excellent base for an adhesive formula. One feature of the same resides in the fact that I can use either the residue as a whole, or else to realize a high grade product, I can extract by any suitable means the adhesive constituent of the residue.

In carrying out the invention, soya beans are first pressed, or otherwise treated, to extract their oily content and the resultant pressed cake is either finely ground, when the whole of the residue is to be used, or else it is treated to extract the adhesive constituent when the high grade adhesive is to be produced. This adhesive constituent, or even the finely ground pressed cake, may be considered as a base for my formula and the same, on account of its adhesive qualities, I will term a tacky substance. I compound the tacky substance with various other agents which may be those commonly used in the manufacture of adhesives, such as hydrated lime and sodium fluoride, the tacky substance and the two agents named being mixed in solution. I, of course, do not confine myself to hydrated lime and sodium fluoride, as any other agents having substantially the same charactertistic qualities will be sufficient. In fact, entirely different agents may be used, but I have not as yet experimented further than the agents of this character. The hydrated lime is, of course, a waterproofing solvent, and the sodium fluoride is a so-called liquefying agent; in other words, it prevents the compound from drying out. I have found that the following proportions give satisfactory results: About two and one-half to three parts hydrated lime, one part sodium fluoride, about ten parts of the tacky substance, and sufficient water to make up a solution of the desired consistency.

The term adhesive, or glue, should not be construed in either the specification or claims as limited to the ordinary accepted meaning of the term, as this tacky substance may be used to advantage in calcimine formulas and other instances where a strong adhesive is not necessarily required.

I have found in practice that by using this tacky substance I can produce a very cheap adhesive, and one that is far better than any that has been made by heretofore known formulas. Soya beans, or rather the residue may be obtained at a very nominal cost and the treatment necessary to either grind the residue when it is used as a whole, or when it is treated to extract the adhesive constituent, is very simple. Consequently the base for the formula is realized without expensive equipment or other high cost.

The so-called tacky substance, it shall be understood, only becomes tacky when mixed with water or a suitable solution. It shall be understood that the tacky substance which constitutes the adhesive constituent, after being finely ground, is in the form of dry meal. After this meal is produced, same is then mixed with hydrated lime and sodium fluoride. Therefore, the protein-containing vegetable material, otherwise called tacky substance, only becomes tacky when mixed with liquid, as aforesaid.

I claim:

1. An adhesive composition comprising the tacky substance of the soya bean, and an alkali-metal liquefying agent.

2. An adhesive composition comprising the tacky substance of the soya bean, an alkali-metal liquefying agent, and a waterproofing agent.

3. An adhesive composition comprising the tacky substance of the soya bean, hydrated lime, and sodium fluoride.

4. The method of making an adhesive composition which consists in including therein the tacky substance of the soya bean.

5. The process of making an adhesive composition which consists in extracting the oil from the soya bean, and adding to the residue an alkali-metal liquefying agent.

6. The process of making an adhesive composition which consists in extracting the oil from the soya bean, and adding to the residue an alkali-metal liquefying agent and a waterproofing agent.

7. The process of making an adhesive composition which consists in extracting the oil from the soya bean, grinding the residue, and then adding to the finely ground residue, hydrated lime and sodium fluoride.

8. In a method of making glue, the steps which consist in treating protein-containing vegetable material derived from the soya bean with an alkali metal compound, and lime.

OTIS JOHNSON.

DISCLAIMER

Reissue No. 16,422.—*Otis Johnson*, San Francisco, Calif. ADHESIVE. Patent reissued September 14, 1926. Disclaimer filed May 23, 1930, by the assignee, *I. F. Laucks, Inc.*

Hereby enters this disclaimer to such interpretation or construction of said specification or claims as follows:

Your petitioner disclaims any interpretation or construction of the specification or claims of the said Johnson reissue patent which brings within the scope or import of the said specification or claims *chemically isolated or chemically extracted soya bean protein.*

[*Official Gazette June 10, 1930.*]

DISCLAIMER

Re. 16,422.—*Otis Johnson*, San Francisco, Calif. ADHESIVE. Patent dated September 14, 1926. Disclaimer filed November 17, 1933, by the assignee, *I. F. Laucks, Inc.*

Hereby enters this disclaimer to said claim 8, which claim is in the following words, to wit:

"8. In a method of making glue, the steps which consist in treating protein-containing vegetable material derived from the soya bean with an alkali metal compound, and lime."

[*Official Gazette December 12, 1933.*]